Sept. 6, 1966 K. R. HORNING ET AL 3,271,674
CIRCUIT VARIANCE ANALYZER INCLUDING SCANNER CONTROLLED
PARAMETER VARIATION OF THE TEST CIRCUIT
Filed April 28, 1961 2 Sheets-Sheet 1

INVENTORS
KENNETH R. HORNING
JOHN MASSEY
BY
ATTORNEY

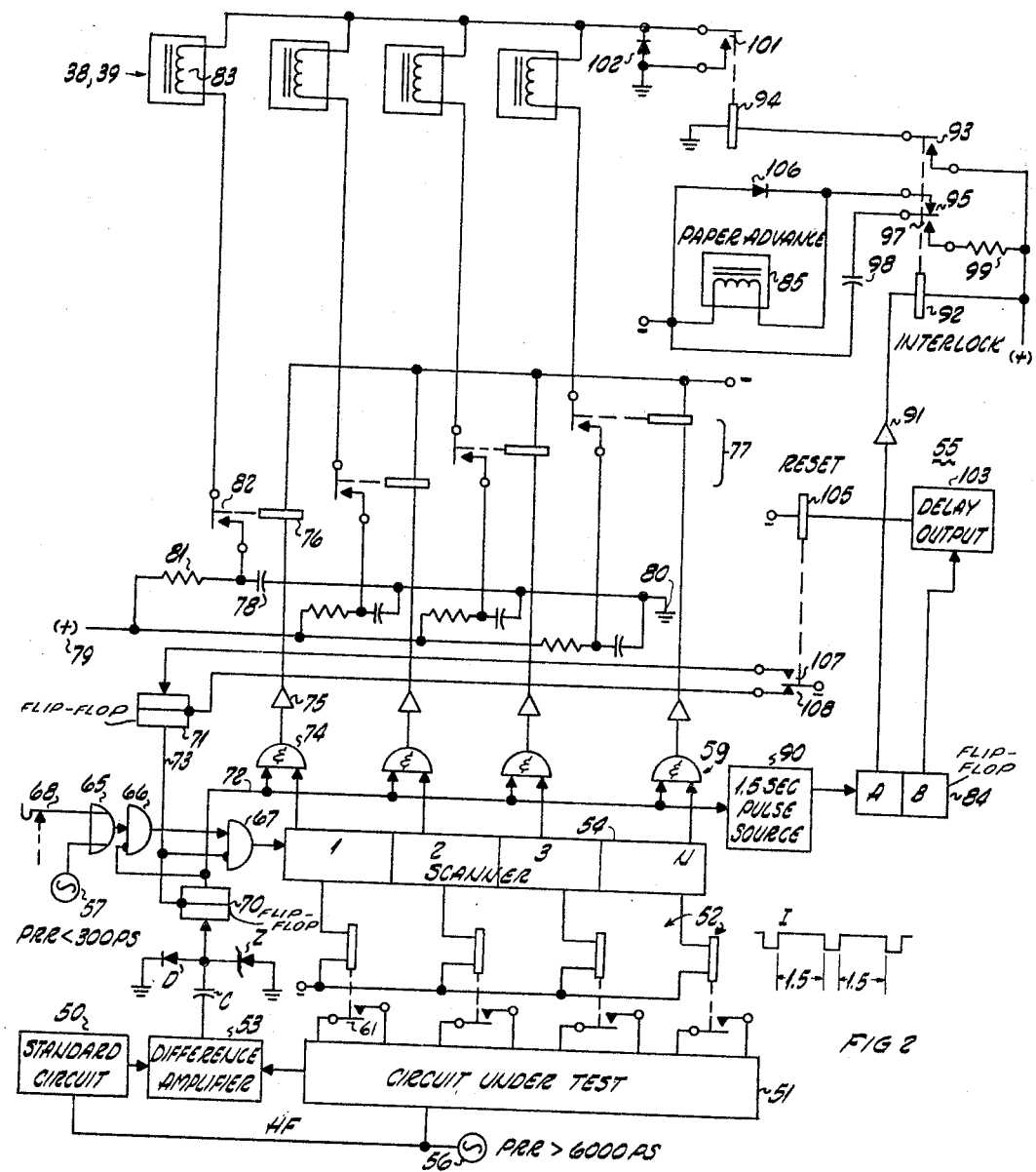
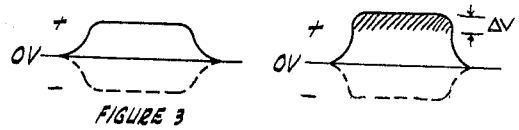
FIG 2
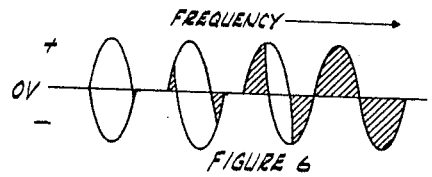
FIGURE 3
FIGURE 5
FIGURE 6
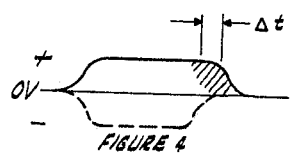
FIGURE 4
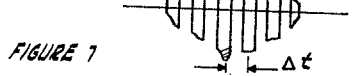
FIGURE 7

United States Patent Office 3,271,674
Patented Sept. 6, 1966

3,271,674
CIRCUIT VARIANCE ANALYZER INCLUDING SCANNER CONTROLLED PARAMETER VARIATION OF THE TEST CIRCUIT
Kenneth R. Horning, Chicago, and John Massey, La Grange Park, Ill., assignors to International Telephone and Telegraph Corporation, New York, N.Y., a corporation of Maryland
Filed Apr. 28, 1961, Ser. No. 106,326
8 Claims. (Cl. 324—73)

This invention relates to circuit variance analyzers and more particularly to multi-channel, command actuated, data recorders for recording any variances noted when standard and unknown circuits are compared.

Frequently, it is necessary to test goods to determine whether they have acceptable tolerances; sometimes called "go, no-go testing." As goods become more complex, a greater number of these tests must be performed on each piece of goods with the result that an extremely long period of time is spent in testing. For example, when it is necessary to test each of X number of variations on y number of circuit parameters, the total number of tests to be performed are $X^y$. Applying real figures to this formula, two variations (high-low limits) of each of sixteen different circuit parameters is the number $2^{16}$; or, 65,536 tests must be performed on each piece of goods having sixteen parameters. By manual means, it would take many weeks to perform all of these tests with an obvious result that the tests are extremely costly. Another obvious result is that sometimes reliability must be sacrificed because it is not always possible to perform all of these tests at a reasonable cost or within an allowable period of time.

On other occasions, it is necessary to analyze new and untried circuits to determine how the circuits will operate under all ambient environmental conditions, variations in component tolerances, and the like. Normally this is done by replacing actual with equivalent circuits which lend themselves to mathematical analysis. However, as electronic components become more complex, it becomes more difficult to write equations for these equivalent circuits. Thus, circuit designers are prone either to make approximations which ignore less important circuit characteristics or to bog down in manipulation of extremely complex equations. Therefore, analyzers of the type described serve an extremely useful purpose by testing "breadboard" circuits under all conceivable operating conditions. Each failure is noted so that individual circuit components may be redesigned or replaced. Thus, by repeatedly testing, redesigning, and retesting, substantially all circuit design errors may be found and eliminated without requiring time consuming manipulations of extremely complex equations.

For these reasons, much emphasis has been placed upon automatic testing equipment; however, none of the known devices has performed in a completely satisfactory manner. For example, certain testing equipment operates on a semiautomatic basis by giving an alarm or shutting down a machine if defective goods are detected. Thus, constant human supervision is required to correct faults as they occur. When efforts were made to include automatic recorders which reduce this need for human supervision, large, expensive, power supplies and control circuits were used.

Accordingly, an object of this invention is to provide new and improved circuit variance analyzers and more particularly to provide multi-channel, command actuated, data recorders operated responsive to variances in a circuit tested. In this connection, an object is to make a great number of comparison tests between standard circuits and circuits under test to determine whether the circuits under test are within acceptable tolerance ranges.

More particularly, an object is to apply a great number of successive circuit parameter variance tests to a circuit under test and to make a record of each test failure or unacceptable difference between the standard and the circuit under test.

Another object of the invention is to provide inexpensive, multi-channel, command actuated, data recorders which do not require large, expensive power units. More specifically, an object is to provide such recorders by assemblying readily available, low cost components without requiring large investments in production tools.

Yet another object of the invention is to provide simplified "go, no-go" test devices capable of performing a great number of tests during an extremely short time period without requiring close human supervision. In this connection an object is to enable personnel operating the circuit variance analyzer to check the results of a vast number of these tests at their convenience. More specifically, an object is to make a total of up to 65,536 combinations of high-low circuit parameter tests within a period of a very few minutes. Also an object is to aid circuit designers by providing test results which pinpoint design errors without requiring extensive manipulation of complex mathematical equations. Thus, an object is to increase the reliability of circuits generally by allowing full testing of all combinations of variations of all circuit parameters.

In accordance with one aspect of this invention, the circuit variance analyzer includes a circuit under test which is supposed to operate acceptably although its parameters vary within certain limits and a standard circuit having fixed parameters. The outputs of both circuits feed into a difference amplifier. A binary scanning device is driven from a pulse source at a relatively low pulse repetition rate. The scanning device operates to vary the circuit parameters of the circuit under test through every possible combination of variations. A free running pulse source simultaneously energizes the inputs of both circuits at a rate which greatly exceeds the circuit's marginal failure rate. If there is a material variance between the outputs of the circuit under test and the standard circuit, the difference amplifier conducts and a record is made of the particular combination of parameter limits responsible for the difference.

In accordance with another aspect of this invention, test failures operate a multi-channel, command actuated, data recorder which includes a supply roll of paper from which a web is drawn through the recorder to a take-up reel. To make a record of each test failure on the web as it is pulled through the recorder, a plurality of normally charged capacitors, each individually associated with a corresponding stage in the binary scanner, are selectively discharged through individually associated solenoids which control printing or perforating devices. After each recording operation, another capacitor-controlled solenoid operates a ratchet mechanism to pull an incremental length of paper from the supply roll and through the recorder to the take-up reel. The record printed or perforated on the web may therafter be studied at an operator's convenience to determine what corrective action, if any, is required.

The above-mentioned and other features and objects of this invention and the manner of obtaining them will become more apparent, and the invention itself will be best understood by reference to the following description of an embodiment of the invention taken in conjunction with the accompanying drawings in which:

FIG. 2 is a combination of a logic and relay circuit and a block diagram showing the circuit variance analyzer which provides the command signals for the recorder of FIG. 1;

FIGS. 3–7 are graphs which are helpful for explaining the manner in which the circuit variance analyzer operates;

Figure 1:
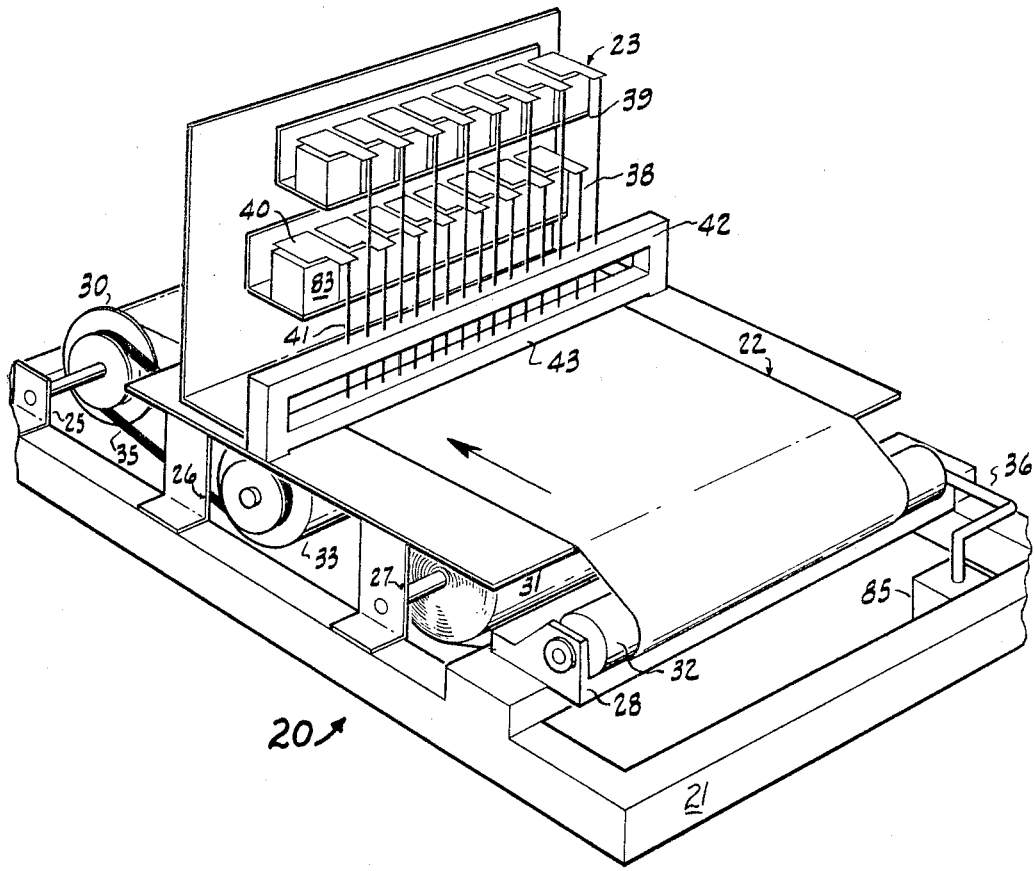
FIG. 1 is a perspective view of a multi-channel, command actuated, data recorder.

FIG. 1 shows the principles of the invention used in connection with a multi-channel, command actuated, data recorder 20. The principal parts of the recorder include a supporting structure 21, a recording medium 22 on which a record is printed or perforated, and a recorder head 23 which actually does the printing or perforating.

The supporting structure 21 is here shown as a generally rectangular frame of channel iron having a number of upstanding tabs or brackets 25–28 for supporting the ends of three rollers or reels 30, 31, 32. A source of power 33, which may be an eelctric motor, is positioned within the frame and the recorder head 23 is positioned above the frame.

The recording medium 22 is supplied from a first of the rollers or reels 31. A second of the rollers or reels 32 is a platen. The third roller or reel 30 is a take-up device on which the recording medium is wound. Thus, a web is drawn from the supply roll 31 over the platen 32, through the recording head 23, and to the third or take-up reel 30. While these three rollers or reels and the recording medium may take many different forms, in view of the commercial availability thereof, the web 22 may be teletypwriter "TWX" paper, the roller 32 may be a typewriten platen, and the take-up reel 30 may be an empty TWX paper spool.

To maintain a uniform web tension, the motor 33 drives the take-up reel 30 via an elastic belt 35. In one exemplary device this belt is an endless coil spring. The coefficient of elasticity of the belt is selected to maintain the correct web tension, i.e. when the web tension reaches a predetermined value the belt begins to slip. If the web tension falls below this value, the motor 33 rotates the take-up reel until web tension returns to normal.

With this arrangement, a solenoid operated linkage 36 associated with a line feed ratchet normally found on the end of a typewriter platen controls the paper feed. More specifically, the motor 33 turns the take-up reel 30 until the web tension reaches the value at which the elastic belt begins to slip. When the solenoid is energized, the linkage 36 pushes the ratchet and rotates the platen 32 through a predetermined angular distance. As the platen rotates, it pulls an incremental amount of TWX paper from the supply roll 31 and the web tension begins to slacken. However, before bags or slacks may form in the TWX paper the tension in the drive belt 35 falls below the point where slippage occurs, and the motor drives the take-up reel, thus returning the web to proper tension where the drive belt once again begins to slip.

Means are provided for making a record of each command signal as it is recevied at the data recorder. More specifically, the device for making this record (recording head 23) includes a number of solenoids 38, 39 mounted in horizontal banks in vertically offset relation. Each solenoid has an individually associated armature, as shown at 40, normally spring biased to a retracted position, which is a raised position as shown in the drawing. When the solenoid is energized, its magnetic flux pulls the armature against this spring bias to an operated or lowered position. Pivotally attached to each armature is a link or bar (as shown at 41) mounted for reciprocal or up-and-down mechanical motion responsive to armature motion. As here shown, these bars are guided through a series of axially aligned openings in upper and lower guideways 42, 43. Thus, when the armatures are held in a normal position by spring tension, the bars are raised; and when the armatures are lowered by energization of the solenoids, the bars are lowered. The exact nature of operations responsive to this reciprocal motion of the bars is not material to the invention. For example, the bars could actuate the keys of a typewriter or an adding machine. In one case they actually perforated the TWX paper.

An advantage of perforating over printing is that the TWX paper may be fed directly into automatic data processing equipment. An advantage of the horizontally mounted, vertical offset solenoids is that the reciprocally sliding bars in the recording head have a close mechanical spacing. Thus, to increase the recording capacity from the sixteen channels actually shown to twenty-four channels, for example, it is only necessary to add a third bank of solenoids having reciprocally sliding bars which pass between those shown in the drawing. By adding still further banks of solenoids, the recording capacity may be increased still more.

An advantage of the mechanical arrangement shown in FIG. 1 is that the data recorder is assembled of reliable, low cost, readily available components of the type presently used in typewriters. The solenoids 38, 39 and associated armatures may be made from commercially available relays. The only specially built parts are the supporting structure 21 and the guideways 42, 43 for the reciprocally moving bars. These parts are relatively simple and are easily manufactured on general purpose tools.

The command signals which drive the data recorder are provided by the electrical circuitry shown in FIG. 2. The basic elements of this circuit are standard circuit 50, a circuit under test 51 having a number of circuit parameters which can be varied by a relay bank 52, a difference amplifier 53, a scanner or binary counter 54, and a read-out circuit 55.

The circuit under test may have any electrical characteristics; it may be an entire assembly, such as a radio receiver, for example; or it may be a single component. In fact, it may be a quality control or other device which tests physical characteristics of goods and produces electrical signals indicative thereof. In a circuit variance analyzer actually built and tested, the circuit under test is either one of a number of printed circuit cards adapted to be plug and jack connected into a larger assembly or a "breadboard" matrix having a newly designed circuit. In this analyzer, the circuit under test is inserted into one jack or socket in a test fixture and another printed circuit inserted into a second jack or socket on the test fixture. Connected to the inputs of these two circuits is a common high frequency pulse source 56. Thus, each time that source 56 produces an output pulse, circuits 50, 51 conduct simultaneously to produce an output signal simultaneously. These output signals are fed into the difference amplifier 53 as they occur.

A difference amplifier is a well known device adapted to provide an output signal only when there is a difference between two input signals. In this circuit, one of the input signals emanates from standard circuit 50 and the other from the circuit under test 51. Therefore, the difference amplifier 53 produces no output signal unless there is a difference in the output from circuits 50, 51. Whether or not there actually is a difference in these two outputs depends upon how closely the electrical characteristics of the circuit under test match those of the standard circuit. To make a precise analysis of these characteristics, it is necessary to compare the two outputs of the circuits as the parameters of one of the two circuits vary. For example, the effects of combinations of high and low parameters limits on the circuit output may be observed.

The output of the difference amplifier 53 feeds through a coupling capacitor C to the input of a memory or flip-flop circuit. The positive half-cycles of current flowing through this capacitor are conducted to ground through diode D and the negative half-cycles are limited by Zener diode Z. Thus, this circuit produces negative pulses of a fixed voltage that is used by the logic circuit components.

For example, if this circuit is similar to most logic circuits which respond to (−)12 volt pulses, the Zener diode Z will clip at (−)12 volts.

Scanning means are provided for orderly selecting successive combinations of the circuit parameters which are varied for testing purposes. This scanner 54 includes a binary counting chain driven from a pulse source 57 at a relatively low pulse repetition rate. The counting chain may include a cascaded series of bistable flip-flop circuits such as the well known Eccles-Jordan bistable multivibrator circuits, for example. As those skilled in the art know, a binary counting chain of this type produces every possible combination of output signals which are conveniently indicated by the symbology of a truth table, as follows:

| Binary Count Step | Output Terminal | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | 1 | 0 | 0 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 | 0 | 0 | 0 |
| 4 | 0 | 0 | 1 | 0 | 0 | 0 | 0 | 0 | 0 | 0 | 0 | 0 | 0 | 0 | 0 | 0 |
| 5 | 1 | 0 | 1 | 0 | 0 | 0 | 0 | 0 | 0 | 0 | 0 | 0 | 0 | 0 | 0 | 0 |
| 6 | 0 | 1 | 1 | 0 | 0 | 0 | 0 | 0 | 0 | 0 | 0 | 0 | 0 | 0 | 0 | 0 |
| 7 | 1 | 1 | 1 | 0 | 0 | 0 | 0 | 0 | 0 | 0 | 0 | 0 | 0 | 0 | 0 | 0 |
| Etc. | | | | | | | | | | | | | | | | |

In the particular example of this truth table, there are a total of 65,536 possible combinations. Each "1" in this truth table indicates that a corresponding relay in a chain of relays 52 operates and that the right-hand (as viewed in the drawing) input of a corresponding "AND" gate in a chain of "AND" gates 59 is energized. These "AND" gates represent either electronic or electromechanic components.

Each of the relays has a contact, such as 61, connected to choose a high or low limit of an individually associated parameter in the circuit under test 51. Therefore, as pulse source 57 drives the scanner or binary counting chain 54 step by step through its 65,536 steps (in this exemplary structure), the relays 52 operate to select all possible combinations of the circuit parameters. The scanner drive circuit extends from the pulse source 57 through an "OR" gate 65, cascaded inhibit gates 66, 67 to the input of the binary flip-flops in scanner 54. Since this chain may also be driven from other sources, a manually operated key 68 is here shown as paralleled with the source 57 via the "OR" gate 65. An advantage of this manual drive is that the circuit parameters may be varied and the circuit under test may be tested under human supervision if it should be necessary to do so.

An advantage resulting from the use of the pulse sources having low and high pulse repetition rates shown here is that tests may be made for failures which occur under marginal conditions. For example, if statistics prove that a certain circuit will fail either within five operations or not at all, the pulse repetition rates of the two pulse sources 56, 57 are selected to repeat each test under each parameter condition a number of times which is much greater than the number five. If the pulse source 57 operates at less than 300 pulses per second and the pulse source 56 operates at greater than 6000 pulses per second, the circuit under test is energized twenty times for each parameter test. Thus, there is a 400% safety factor over the five tests actually required to produce failure under the assumed marginal conditions. These figures are arbitrarily chosen to illustrate the point; the two pulse sources may operate at any desired pulse repetition rate. Another advantage is that there is no need to synchronize the stepping of the binary counting chain in scanner 54 with the energizations of the standard circuit and the circuit under test because the relation between the two pulse repetition rates ensures energization of both circuits 50, 51 during testing on each step of the binary counter.

The principal logic circuit components include flip-flop or memory circuits 70, 71 which normally do not provide an output signal unless the input conductor (marked by an arrowhead) is energized. After this conductor is energized, current flows over the output conductors 72, 73 until the inhibit or reset terminal (marked by a heavily inked dot) is energized whereupon the output current ceases. Another type of component is the inhibit gates 66, 67 shown by semi-circles each including an inhibit terminal marked by a heavily inked dot. Normally, any signal occurring on the input terminal (marked by an arrowhead) is conducted through the gate to its output terminal. However, if the terminal marked by the heavily inked dot is energized, no signals pass through the inhibit gate and nothing appears at the output terminal. Yet another type of component is an "AND" gate, such as 74, for example. When both input terminals (marked by arrowheads) are energized simultaneously, current flows from the output of the "AND" gate through an amplifier, such as 75, to operate a corresponding relay, such as 76, in a group of control relays 77. Finally, the logic symbol for a flip-flop circuit is shown by a rectangle 84 having "A" and "B" sides, a multivibrator, for example. Each pulse applied to the input conductor (marked by an arrowhead) switches the output to the side opposite to the side on which it is then standing. Thus, if the flip-flop stands on its "A" side and three pulses are received, for example, the output conductors are pulsed in the order "A, B, A." This particular flip-flop circuit automatically resets so that its output appears on its "A" side at the start of each operation.

In carrying out this invention, the control relays in group 77 selectively discharge a plurality of normally charged capacitors to provide the command signals fed into the data recorder of FIG. 1. The capacitors (one of which is numbered 78) are charged via a parallel circuit traced from a positive battery 79 to a ground 80. In series with each of these capacitors is a resistor (such as 81) which limits current flow into the capcitor so that a dscrete period of time is required for the capacitors to charge. Near the top of FIG. 2 is shown a plurality of solenoids 38, 39. As shown in FIG. 1, these solenoids operate the reciprocally moving bars which actually print or perforate the TWX paper.

Thus, when any control relay closes its contacts, the associated normally charged capacitor discharges through a solenoid to make a record on the TWX paper. For example, before a test failure is detected capacitor 78 charges. Then, assuming that a failure occurs on the first binary count step of the scanner 54 (see the truth table above), relay 76 operates because the difference amplifier 53 triggers flip-flop 70 to energize the left-hand input of "AND" gate 74 at the same time that scanner 54 energizes the right-hand input. When relay 76 operates, contacts 82 close to discharge capacitor 78 through the solenoid 83, thereby moving the bar 41 (FIG. 1) to make a test failure record on the TWX paper.

An advantage resulting from these uses of charged capacitors to energize solenoids which control the recorder mechanism is that the power for each recorder operation accumulates over a period of time. Thus, the batteries or other power supplies may have a much smaller capacity than they would have if they were subject to instantaneous demand for full power. This eliminates the need for large, expensive power supplies.

With the foregoing description of the components in mind, it is thought that the invention will be understood best from the following description of how the circuit variance analyzer operates during an actual test.

First, a supply of TWX paper is loaded into and a web is drawn through the recorder. Then, the standard circuit 50 is plugged into one jack or socket in a test fixture and the circuit under test 51 is plugged into another jack or socket. Next, the electrical circuit is energized and the control capacitors, such as 78, charge. A pulse from the low frequency source 57 is applied through the inhibit gates 66, 67 to drive the scanner 54 through its binary counting cycle. On each step, a circuit is completed from the scanner 54 to relays 52 for selecting the circuit parameters and to the right-hand input of the "AND" gates 59. Simultaneously, the pulse source 56 energizes both the standard circuit 50 and the circuit under test 51 with the parameters chosen by the relay operations. Assuming that the circuit under test 51 meets all test requirements, no current flows from the difference amplifier 53 and nothing is recorded on the web 22. After all tests are completed without detecting any material difference in the outputs of the two circuits, the circuit under test 51 is replaced by a different circuit and the tests are repeated.

Means are provided for detecting differences between the output of the circuit under test and the standard circuit. The exact nature of the difference which may occur in these signals depends upon the nature and parameters of the circuits being tested. For example, in each of the FIGS. 3–7 the output of the standard circuit 50 is shown by a solid line curve and the output of the circuit under test 51 is shown by a dash line curve. Voltage changes are plotted along the vertical axis and time is plotted along the horizontal axis.

When both circuits 50, 51 have the same characteristics equal potentials are applied to the difference amplifier 53 and there is no output from the amplifier 53. On the other hand, if there is a significant variance in the output of the two circuits, the output of the circuit under test may extend over a longer or shorter period of time than the output of the standard circuit, as shown by the notation $\Delta t$ in FIG. 4. Thus, the two output voltages are different by the amount shown in the cross-hatched area of FIG. 4 and that difference causes a current flow from the difference amplifier that triggers flip-flop 70.

In FIG. 5, the difference between the output of the standard circuit 50 and the circuit under test 51 is a matter of voltage amplitude, $\Delta V$, as shown by the cross-hatched area. In FIG. 6 the output of the two circuits varies as a function of frequency and the difference shown by the cross-hatched area is amplified in the difference amplifier 53. In FIG. 7 the two output signals have an arbitrary envelope shape which cannot be predicted—random noise, for example. However, since pulse source 56 switches the circuits 50, 51 "off" and "on," the two signals are sampled during recurring time frames defined by the pulses from source 56 as they energize circuits 50, 51. Current flows from circuits 50, 51 into difference amplifier 53 during individual time frames, here designated by the symbols $t1$–$t6$. Therefore, during time frames $t3$, $t4$ when there is a difference amplifier 53 conducts. In another circuit the source 56 may have a sinusoidal output and the signals fed into the difference amplifier are compared continuously.

In any event, when a difference voltage occurs, it is amplified by the difference amplifier and applied through the coupling capacitor C to trigger the memory or flip-flip circuit 70. The flip-flop turns "on" and inhibits the gate 66 to stop the advance of the scanner 54. The output of flip-flop 70 also energizes the left-hand input of each "AND" gate 59 and starts a 1.5 second pulse source 90. This source may be a free-running multivibrator, for example, which produces a pulse every 1.5 seconds (as shown by waveform I) as long as it is energized from flip-flop 70.

If it is assumed that a test failure occurs on the first binary count step (as shown above in the truth table), scanner 54 energizes the right-hand input terminal of "AND" gate 74 while flip-flop 70 enregizes its left-hand input terminal. Current flows from "AND" gate 74 through amplifier 75 to operate relay 76 and close contacts 82.

After 1.5 seconds, source 90 pulses flip-flop 84 and current flows from its "A" side through amplifier 91 to operate an interlock relay 92. Responsive thereto, contacts 93 close to operate a power relay 94; contacts 95 open to break a capacitor discharging circuit through paper advance solenoid 85; and contacts 97 close a capacitor charging circuit traced from (−) battery through capacitor 98, contacts 97, and resistor 99 to (+) battery.

When relay 94 operates, contacts 101 close a circuit traced from normally charged capacitor 78, through contacts 82, solenoid 83, and contacts 101 to ground. Diode 102 provides spark protection. Solenoid 83 attracts armature 40 (FIG. 1), which lowers bar 41 to perforate the TWX paper 22. After the capacitor 78 discharges sufficiently, the bias spring of the armature 40 raises the bar 41 to a normal position.

Means are provided for advancing the recording medium after each test failure is recorded. More specifically, after another 1.5 second period, another pulse from source 90 drives flip-flop 84 to its "B" side. The input of a delay circuit 103 is energized, but no current flows to the winding of a reset relay 105 for a period of time which is adequate to ensure proper circuit operation. Current ceases to flow through amplifier 91 when flip-flop 84 switches "off" its "A" side. Relay 92 releases; contacts 93 open to release relay 94; contacts 97 open to break the capacitor charging circuit; and contacts 95 close to discharge capacitor 98 through solenoid 85. Diode 106 gives spark protection. When solenoid 85 is energized from capacitor 98, its flux pulls linkage 36 (FIG. 1), the associated ratchet rotates platen 32, and the web 22 is pulled through the recorder.

When delay circuit 103 times out and energizes reset relay 105, contacts 107 close to switch "on" flip-flip 71. Its output inhibits gate 67 and resets flip-flop 70. Gate 66 conducts after flip-flop 70 resets; however, the inhibited gate 67 prevents pulse source 57 from driving scanner 54. When flip-flop 70 turns "off," "AND" gate 74 ceases to conduct, relay 76 releases, contacts 82 open, and capacitor 78 recharges slowly through resistor 81. Also, when the flip-flop 70 turns "off," the 1.5 second pulse source 90 switches "off," flip-flop 84 returns to normal, and current through delay circuit 103 terminates to release relay 105. After relay 105 releases, contacts 108 close to reset flip-flop 71. After flip-flop 71 resets, gate 67 is no longer inhibited, and pulse source 57 drives the scanner 54 to conduct the next test.

Figure 8:
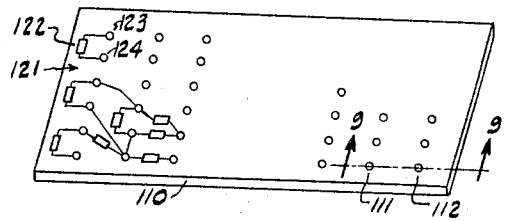
FIG. 8 is a perspective view of a partially wired "breadboard" matrix.
Figure 9:
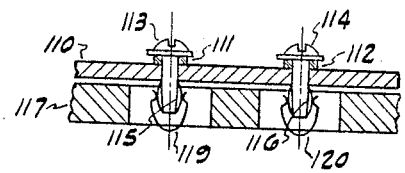
FIG. 9 is a cross-sectional view taken along line 9—9 of FIG. 8 and partially broken away to show plug and jack connections.

Means are provided for testing newly designed circuits to determine whether they will function in the required manner under all possible high-low parameter conditions. To accomplish this, a "breadboard" matrix (FIGS. 8, 9) is provided to receive and hold the lead wires of electrical components which form the circuit under test. This matrix includes a plate of insulating material 110 carrying a series of electrically conductive terminals, two of which are numbered 111, 112. The upper ends of these terminals are here shown as screws 113, 114; however, they may also be spring clips or the like. In any event, the upper ends provide a way of quickly and easily assembling and replacing components. The lower ends of these terminals 115, 116 are here shown as having the well known "banana plug" configuration; although, other configurations may be used also.

Associated with the circuit variance analyzer is a test fixture 117 having a number of jacks 119, 120 imbedded therein. These jacks are geometrically arranged to receive the banana plugs of the breadboard matrix, thus electrically connecting the components of the circuit under test into the circuit variance analyzer.

The newly designed circuit is wired into the "breadboard" matrix as shown generally at 121. For example, the leads of a resistor 122 may be secured into position by the screws on the upper ends of the terminals 123, 124. Then the "breadboard" matrix is placed over the test fixture 117 with the banana plugs 115, 116 aligned over the jacks 119, 120. The "breadboard" matrix is pushed into position and the newly designed circuit is tested in the above described manner. If a test failure occurs when relays 52 apply high-low parameter conditions to resistor 122, for example, it is only necessary to loosen the screws of terminals 123, 124, replace the resistor 122 with another component, tighten the screws, and retest.

In this manner, the newly designed circuit may be tested, redesigned, and etested until it operates in the desired manner under all parameter conditions. Moreover, all of this is accomplished expeditiously and without requiring extensive manipulation of complex equations.

In this manner, the circuit successively and automatically tests a great number of circuit parameters on a "go," "no-go" basis and makes a record of each test failure. Thus, the testing is completed at electronic speeds without requiring close human supervision. On the contrary, the human supervisor may check the result of a vast number of tests at his convenience by studying data recorded on the TWX paper. Thus, the general level of circuit reliability is greatly increased because unknown circuits may be given 100% testing.

It should be understood that the foregoing description of a specific example of the invention is not to be considered as a limitation on its scope.

We claim:

1. A circuit variance analyzer for detecting variations in the output of a circuit under test, comprising a standard circuit having output characteristics corresponding to the desired output characteristics of said circuit under test, scanning means driven at a relatively low rate for providing predictable combinations of scanning outputs, selecting means operated responsive to said combinations of outputs of said scanning means for selecting successive combinations of control circuitry, said control circuitry operated to vary the parameters of said circuit under test, means driven at a relatively high rate for simultaneously, repeatedly energizing the input of said standard circuit and said circuit under test to cause said circuits to produce outputs, comparator means operated responsive to differences in the outputs of said standard circuit and said circuit under test for providing command signals, print-out means operated responsive to said command signals and said scanning outputs for visually indicating said differences on a recording medium.

2. The circuit variance analyzer of claim 1 wherein said print-out means comprises a plurality of capacitors and associated print-out solenoids, and control means operated responsive to the outputs of said scanning means and said command signals for controlling said print-out means to discharge selected one of said capacitors through said associated print-out solenoids to operate said print-out solenoids.

3. The circuit variance analyzer of claim 1 wherein said high rate is in the order of 20 times said low rate.

4. The circuit variance analyzer of claim 2 wherein said print-out means comprises at least one normally discharged capacitor and associated solenoid, and means responsive to the operation of said control means for charging said at least one normally discharged capacitor and thereafter discharging said normally discharged capacitor through its said associated solenoid to advance said recording medium.

5. The circuit variance analyzer of claim 4 wherein said standard circuit comprises means for providing an output having characteristics corresponding to the desired output characteristics of electric components to be tested, means comprising a breadboard matrix having a series of electrically conductive terminals for receiving and holding a plurality of said electrical components to be tested, and plug-in means for electrically connecting said matrix into said variance analyzer in place of said test circuit.

6. The circuit variance analyzer of claim 4 wherein means are provided for drawing a web from a supply roll of said recording medium to a take-up reel, and means comprising an elastic belt for maintaining uniform web tension.

7. The circuit variance analyzer of claim 4 wherein ratchet driven platen means are provided for pulling incremental lengths of said recording medium from said supply roll responsive to the discharge of said normally discharge capacitor through its associated solenoid, and means for delaying said discharge until after operation of said print-out solenoids.

8. The circuit variance analyzer of claim 1 wherein said scanning means comprises Eccles-Jordan bistable multivibrator means.

References Cited by the Examiner

UNITED STATES PATENTS

| | | | |
|---|---|---|---|
| 1,131,104 | 3/1915 | Avram | 346—14 |
| 1,309,235 | 7/1919 | Avram | 346—14 |
| 2,425,080 | 8/1947 | Blakeslee | 346—34 |
| 2,878,313 | 3/1959 | Tolson et al. | 346—74 X |
| 2,881,388 | 4/1959 | Behrend | 324—57 |
| 2,920,818 | 1/1960 | Taylor et al. | |
| 2,925,591 | 2/1960 | Burkhart. | |
| 2,950,159 | 8/1960 | McCulley | 346—79 X |
| 2,950,437 | 8/1960 | Stahl | 324—73 |
| 2,977,535 | 3/1961 | O'Connor et al. | 324—73 |
| 3,054,954 | 9/1962 | Boscia | 324—158 |
| 3,182,253 | 5/1965 | Dorsch | 324—73 X |

WALTER L. CARLSON, *Primary Examiner.*

LLOYD McCOLLUM, *Examiner.*

G. S. KINDNESS, E. L. STOLARUN,
*Assistant Examiners.*